United States Patent
Onde

(10) Patent No.: US 11,079,256 B2
(45) Date of Patent: Aug. 3, 2021

(54) DEVICE FOR DETERMINING THE MOVEMENT OF A ROTARY ELEMENT, PARTICULARLY FOR READINGS OF WATER AND/OR GAS METERS

(71) Applicant: STMicroelectronics (Rousset) SAS, Rousset (FR)

(72) Inventor: Vincent Onde, Fuveau (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 16/838,337

(22) Filed: Apr. 2, 2020

(65) Prior Publication Data

US 2020/0225065 A1     Jul. 16, 2020

Related U.S. Application Data

(63) Continuation of application No. 16/237,938, filed on Jan. 2, 2019, now Pat. No. 10,648,836, which is a (Continued)

(30) Foreign Application Priority Data

Jun. 7, 2016   (FR) ..................................... 1655182

(51) Int. Cl.
  *G01D 5/249*   (2006.01)
  *G01D 4/00*    (2006.01)
  *G01D 5/347*   (2006.01)
(52) U.S. Cl.
  CPC ............. *G01D 5/249* (2013.01); *G01D 4/008* (2013.01); *G01D 5/2497* (2013.01);
  (Continued)

(58) Field of Classification Search
  CPC ...... G01D 5/249; G01D 4/008; G01D 5/2497; G01D 5/34792; Y02B 90/20
  See application file for complete search history.

(56) References Cited

U.S. PATENT DOCUMENTS

| 3,083,357 A | 3/1963 | Chapin et al. |
| 3,710,265 A | 1/1973 | Gray |

(Continued)

FOREIGN PATENT DOCUMENTS

| CN | 85107469 A | 4/1987 |
| CN | 1641319 A | 7/2005 |

(Continued)

OTHER PUBLICATIONS

First Office Action for co-pending CN Appl. No. 201911235070.4 dated Sep. 22, 2020 (5 pages).

(Continued)

*Primary Examiner* — Manuel A Rivera Vargas
(74) *Attorney, Agent, or Firm* — Crowe & Dunlevy

(57) ABSTRACT

A rotary element is equipped with a pattern representing a reflected binary code on at least three bits. A detection circuit is configured to sense the pattern and deliver an incident signal encoded in reflected binary code on at least three bits. The incident signal is converted by a transcoding circuit into an intermediate signal encoded in reflected binary code on two bits. A decoding stage decodes the intermediate signal and outputs at least one clock signal representing the amount of rotation of the rotary element and a direction signal representing the direction of rotation. A processing circuit determines the movement of the rotary element, and has at least one general purpose timer designed to receive the at least one clock signal and direction signal.

13 Claims, 7 Drawing Sheets

Related U.S. Application Data continuation of application No. 15/379,329, filed on Dec. 14, 2016, now Pat. No. 10,215,594.

(52) U.S. Cl.
CPC .......... *G01D 5/34792* (2013.01); *Y02B 90/20* (2013.01); *Y04S 20/30* (2013.01)

(56) References Cited

U.S. PATENT DOCUMENTS

| | | | | |
|---|---|---|---|---|
| 5,014,270 | A | * | 5/1991 | Sillere .................. H04J 3/0685 370/516 |
| 6,336,362 | B1 | | 1/2002 | Ducnas |
| 2003/0028336 | A1 | | 2/2003 | Masar et al. |
| 2005/0088667 | A1 | * | 4/2005 | Yeo .................. G01D 5/34776 356/617 |
| 2005/0236560 | A1 | * | 10/2005 | Ch'ng ................ G01D 5/34792 250/231.13 |

FOREIGN PATENT DOCUMENTS

| | | |
|---|---|---|
| CN | 1860348 A | 11/2006 |
| CN | 102118172 A | 7/2011 |
| CN | 104089673 A | 10/2014 |
| CN | 205156984 U | 4/2016 |
| CN | 206609489 U | 11/2017 |
| DE | 19508834 A1 | 9/1996 |
| EP | 0089171 B1 | 7/1987 |
| JP | 4290281 B2 | 7/2009 |
| WO | 2004090832 A1 | 10/2004 |
| WO | 2007068242 A1 | 6/2007 |

OTHER PUBLICATIONS

INPI Search Report and Written Opinion for FR 1655182 dated Jan. 26, 2017 (7 pages).
First Office Action and Search Report from co-pending CN Appl. No. 201611045186.8 dated Apr. 17, 2019 (6 pages).
EFM32: "21 LESENSE—Low Energy Sensor Interface," 2010 (47 pages).
Freescale Semiconductor, Inc. Application Note AN5052: "Low-Power Rotation Sensing with L-C Sensors and Kinetis L MCUs," 2015 (16 pages).
STMicroelectronics, "General Purpose Timer Cookbook," AN4776, Jun. 2016.
STMicroelectronics: "Low-Power Timer (LPTIM) Applicative Use-Cases on STM32 MCUs," AN4865, Nov. 2016 (19 pages).

\* cited by examiner

← → correct transition
←--→ erroneous transition

| | 3-bit Gray code |
|---|---|
| 110 | |
| 10 | 2-bit Gray code |

| Position of disc | 0 | 1/6$^e$ | 2/6$^e$ | 3/6$^e$ | 4/6$^e$ | 5/6$^e$ | 1 | 1+1/6$^e$ | 1+2/6$^e$ | 1+3/6$^e$ | 1+4/6$^e$ | 1+5/6$^e$ |
|---|---|---|---|---|---|---|---|---|---|---|---|---|
| ZYX | 101 | 100 | 110 | 010 | 011 | 001 | 101 | 100 | 110 | 010 | 011 | 001 |
| 2-bit Gray code | 00 | 01 | 11 | 10 | 00 | 01 | 11 | 10 | 00 | 01 | 11 | 10 |

DEVICE FOR DETERMINING THE MOVEMENT OF A ROTARY ELEMENT, PARTICULARLY FOR READINGS OF WATER AND/OR GAS METERS

CROSS REFERENCE TO RELATED APPLICATIONS

This application is a continuation of U.S. application patent Ser. No. 16/237,938, filed Jan. 2, 2019, which is a continuation of U.S. application patent Ser. No. 15/379,329, filed Dec. 14, 2016, now U.S. Pat. No. 10,215,594, which claims the priority benefit of French patent application number 1655182, filed on Jun. 7, 2016, the disclosures of which are hereby incorporated by reference in their entireties.

TECHNICAL FIELD

Modes of embodiment and application of the invention concern the processing of encoded signals, particularly signals encoded with a reflected binary code (also known as a Gray code), notably for the determination of the movement of a rotary element, and more particularly, but not exclusively, for the reading of fluid meters such as water and/or gas meters.

BACKGROUND

Water and/or gas meters may be equipped with a rotary disc equipped with a pattern representing a Gray code on two or more bits which, when rotated in front of two or more sensors, enables signals encoded in Gray code on two or more bits to be delivered.

A software program is executed to determine, on the basis of the signals received by the sensors, information on the movement of the disc, particularly its number of revolutions, from which the water or gas consumption can be deduced.

However, the software program is complex, and has become increasingly more so as the number of sensors rises, while they must also be programmable for adaptation to any number of sensors used, and therefore to any number of bits of the Gray code, which further increases their complexity.

This results in, notably, high current consumption, which is problematic when these devices are designed for battery operation.

There is consequently a need to provide a device which is simple to use, with low energy consumption, and permits the simple determination of the movement of a rotary element equipped with a pattern representing a reflected binary code (Gray code) on multiple bits.

There is also a need to provide a device of this type which allows rapid calibration in the factory while being robust against fraudulent acts which aim to reduce the actual value of fluid consumption.

SUMMARY

According to one aspect, therefore, a device is proposed for determining the movement of a rotary element equipped with a pattern representing a reflected binary code (Gray code) on at least three bits, comprising: a detection stage, comprising at least three sensors interacting with the rotary element, and configured to deliver an incident signal encoded in reflected binary code on at least three bits during the rotation of said pattern in front of said sensors, said reflected binary code including, if required, one or more erroneous or prohibited states based on the configuration of the sensors, a transcoding circuit configured to convert the incident signal into an intermediate signal encoded in reflected binary code on two bits, a decoding stage for receiving the intermediate signal, having a decoding circuit configured to deliver at least one clock signal representing the amount of rotation of the rotary element and a direction signal representing the direction of rotation, and a processing stage configured to determine the movement of the rotary element and having at least one "general purpose timer" (GPT) (the term commonly used for this device by those skilled in the art), designed to receive said at least one clock signal and said direction signal.

Thus, regardless of the number of sensors used, and therefore regardless of the number of bits of the incident signal encoded in Gray code, use is made of a transcoding circuit, that is to say a hardware, not a software, circuit, that is adapted to the number of bits of the incident signal, this circuit being configured to convert this incident signal into an intermediate signal encoded in Gray code on two bits.

This makes it possible to use a decoding circuit, also implement in a hardware, not software, circuit, which will deliver at least one or sometimes two clock signals, and a direction signal.

A general purpose timer can then be used in the processing stage.

In other words, regardless of the number of bits of the binary signal encoded in Gray code, the same decoding circuit and a general purpose timer are used.

It should be noted here that a general purpose timer is a conventional timer, whose structure is well known to those skilled in the art, and which can be used, notably, to measure events, such as the interval between two pulses, or to generate pulse width modulated (PWM) signals or a time base.

These timers may be synchronous or asynchronous.

The purely hardware embodiment of the transcoding circuit and the decoding circuit thus simplifies implementation and reduces energy consumption. It also allows faster calibration of the timers in the factory.

Additionally, a number of sensors at least equal to three, corresponding to an initial Gray code on at least three bits, when combined with hardware transcoding providing a certain number of prohibited transitions between the different states of the Gray code, helps to improve the robustness of the device against attempted fraud.

According to one embodiment, the decoding circuit may be configured to deliver a first clock signal representing the amount of rotation of the rotary element in a first direction of rotation, and a second clock signal representing the amount of rotation of the rotary element in a second direction of rotation.

In this case, the processing stage may comprise two general purpose timers, associated with the first and second clock signals respectively.

According to one embodiment, said at least one general purpose timer may be a synchronous timer having at least one clock synchronization circuit containing D flip-flops, receiving said at least one clock signal delivered by the decoding circuit and timed by a timing clock signal.

The decoding stage then advantageously further comprises a clock gating circuit configured to deliver a clock gating signal and the timing clock signal obtained from a base clock signal, for example a high-frequency clock signal commonly used by a microcontroller, this action taking place only in the presence of the clock gating signal.

The gating circuit is also configured to allow the delivery of the intermediate signal to the decoding circuit only if the clock gating signal has already been delivered.

According to another embodiment, the transcoding circuit is also advantageously configured to deliver an error signal in the presence of a prohibited or erroneous transition between two values of the reflected binary code and/or in the presence of an erroneous or prohibited state of the reflected binary code.

This makes it possible, notably, to improve fraud prevention in the use of meters.

The number of sensors may be three, and these sensors may be, for example, offset by 120° from each other, with, in this case, a Gray coding from which some codes or states are absent because they are erroneous or prohibited.

According to another aspect, a device as defined above is proposed, for reading a gas or water meter.

BRIEF DESCRIPTION OF THE DRAWINGS

Other advantages and features of the invention will be apparent from a perusal of the detailed description of embodiments and applications, which is not limiting in any way, and the appended drawings, in which.

DETAILED DESCRIPTION OF THE DRAWINGS

Figure 1:
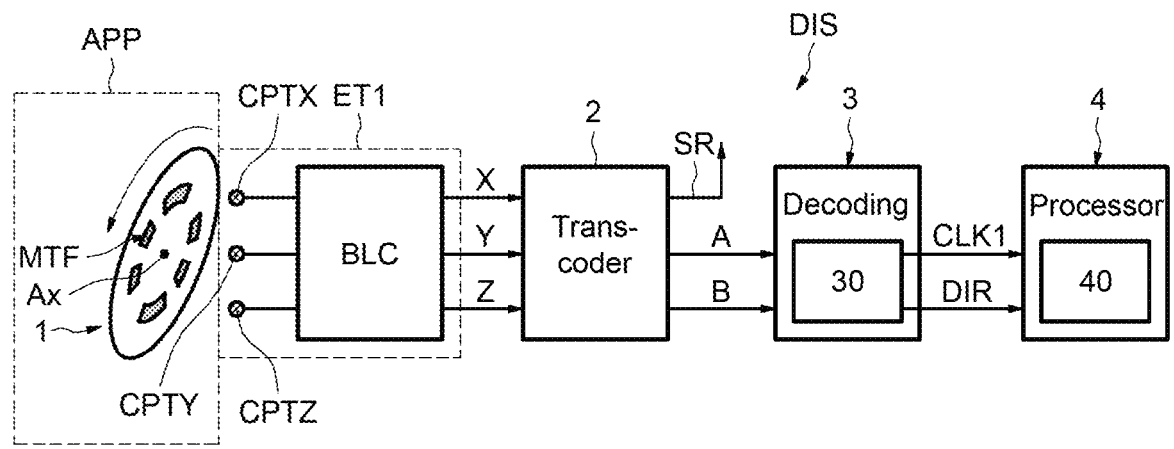
FIG. 1 is a block diagram of a device for determining the movement of a rotary element.

In FIG. 1, the reference DIS denotes a device for determining the movement of a rotary element 1 equipped with a pattern MTF representing a reflected binary code (Gray code) on a plurality of bits, in this case three bits.

The disc 1 can rotate in one direction or another about an axis Ax and may be, for example, incorporated in an apparatus APP such as a water or gas meter, or more generally a fluid meter, for example.

When it rotates, the disc obscures one or more sensors CPTX, CPTY, CPTZ. The signals delivered by these sensors are processed in a processing unit BLC of a detection stage ET1 so as to deliver binary components X, Y, Z which here form an incident signal encoded according to a Gray code on three bits.

In the example described here, the sensors are optical reading sensors, but obviously other types of sensor are possible, for interaction with other types of disc, for example magnetic reading sensors or Hall effect sensors. Evidently, the structure of the processing stage, and notably that of the unit BLC, is adapted to the nature of the sensors.

The incident signal, delivered continuously or in a sampled way, and comprising the three bits Z, Y, X (X being the least significant bit and Z being the most significant bit), is processed in a transcoding circuit 2 which converts the incident signal into an intermediate signal encoded in Gray code on two bits A, B.

The intermediate signal A, B is then processed in a decoding stage 3, having a decoding circuit 30 configured to deliver at least one clock signal CLK1 representing the amount of rotation of the rotary element and a direction signal DIR representing the direction of rotation of the disc 1.

These signals CLK1 and DIR are then processed in a processing stage 4 comprising, notably, a general purpose timer (GPT) 40 which can be used to determine the characteristics of the movement of the disc 1, for example the number of revolutions performed.

As is well known to those skilled in the art, the reflected binary code (Gray code) is a type of binary coding that can be used to modify only one bit at a time during an incrementation or decrementation. This can prevent the occurrence of undesirable transient states which may appear in conventional binary codes when more than one bit may be modified in an incrementation or a decrementation.

Figure 2:
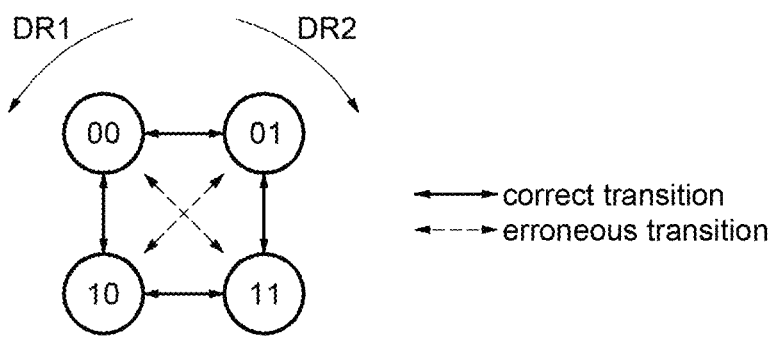
FIG. 2 shows schematically the transitions between the different states of a two-bit Gray code during a rotation of the rotary element.

FIG. 2 shows schematically the transitions between the different states of a two-bit Gray code during a rotation of the rotary element in the direction DR1 or in the direction DR2.

More precisely, starting from state 00, it is possible, if rotating in the direction DR1, to pass successively through states 10, 11 and 01, and then return to state 00.

If rotating in the opposite direction, that is to say in the direction DR2, it is possible, starting from state 00, to pass successively through states 01, 11 and 10 before returning to state 00.

The arrows in solid lines indicate correct transitions, while the arrows in broken lines indicate prohibited or erroneous transitions.

In other words, if there is a movement from state 11 to state 00, for example, this signifies either a meter malfunction or an attempted fraud.

Figure 3:
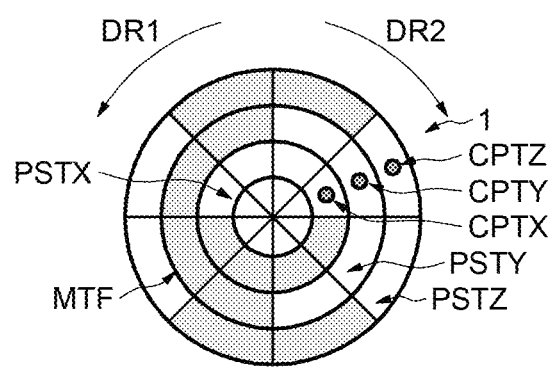
FIGS. 3 and 4 illustrate an embodiment using an optical disc encoded with a Gray code on three bits.
Figure 4:
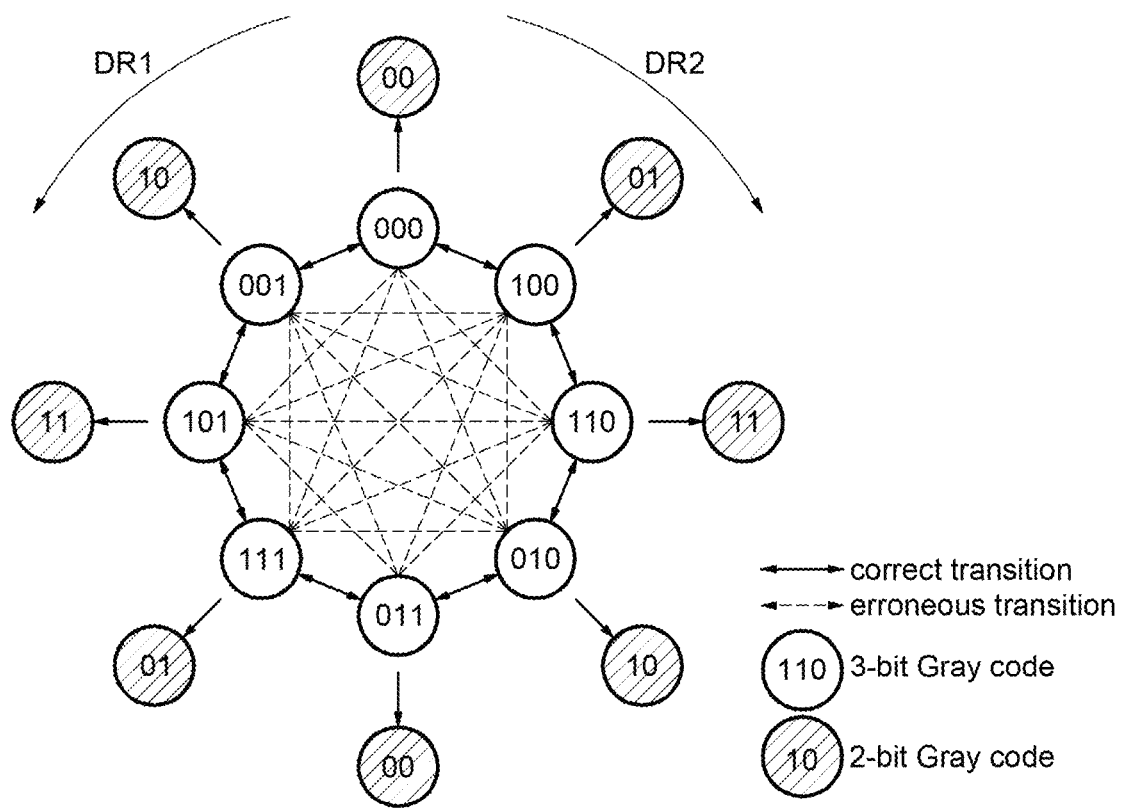

Reference will now be made to FIGS. 3 and 4 to illustrate a first embodiment using an optical disc encoded with a Gray code on three bits.

As illustrated in FIG. 3, the disc 1 is divided into eight angular sectors of 45° each, and the pattern MTF includes three tracks PSTX, PSTY and PSTZ on which optically opaque patterns have been placed at certain locations.

The optical sensors CPTX, CPTY and CPTZ are aligned in this case.

In the example described here, when, during the rotation of the disc in the direction DR1 or in the direction DR2, if a sensor is illuminated, that is to say not obscured by an opaque area, the corresponding bit (X, Y or Z) is equal to 0, while when this sensor is obscured by an opaque part the corresponding bit is equal to 1.

The state machine corresponding to the different transitions of the three-bit Gray code and to the transcoding into a two-bit Gray code is shown in FIG. 4.

It should be noted here that, by convention, the sensor CPTX supplies the signal X which is the least significant bit, while the sensor CPTZ supplies the bit Z which is the most significant bit.

In FIG. 4, the states appearing in non-hatched circles represent the states of the three-bit Gray code, while the states shown in hatched circles represent the states of the two-bit Gray code after transcoding.

Additionally, here again the arrows in solid lines represent correct transitions, while the arrows in broken lines represent prohibited or erroneous transitions.

Thus, starting from state 000 with the rotary element rotating in the direction DR1, we pass successively through states 001, 101, 111, 011, 010, 110 and 100 before returning to state 000.

Each of these states of the three-bit Gray code is also associated with a state of the two-bit Gray code.

It can therefore be seen that, in this case, for a full revolution in the direction DR1 the successive states of the two-bit Gray code must be states 00, 10, 11, 01, 00, 10, 11, 01 successively, then back to 00.

Evidently, if the element rotates in the reverse direction DR2, the succession of states is reversed.

On the basis of this state machine and the corresponding correct and erroneous transitions, a tool for the logical synthesis of a state machine which is well known to those skilled in the art can be used to determine the logical structure of the transcoding circuit 2, which, starting from the bits X, Y, Z, can supply the intermediate signal on two bits A and B as well as an error signal SR (FIG. 1) if there is a passage through a prohibited transition.

For guidance and by way of non-limiting example, the state machine synthesis tool that is used may be the tool known to those skilled in the art under the name of Design Compiler, produced by Synopsys.

Figure 5:
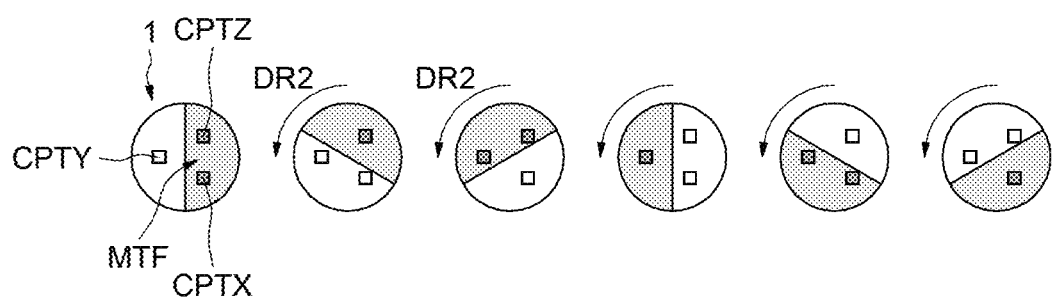
FIGS. 5 to 7 show other possible configurations for obtaining a Gray code on three bits.
Figures 6, 7:
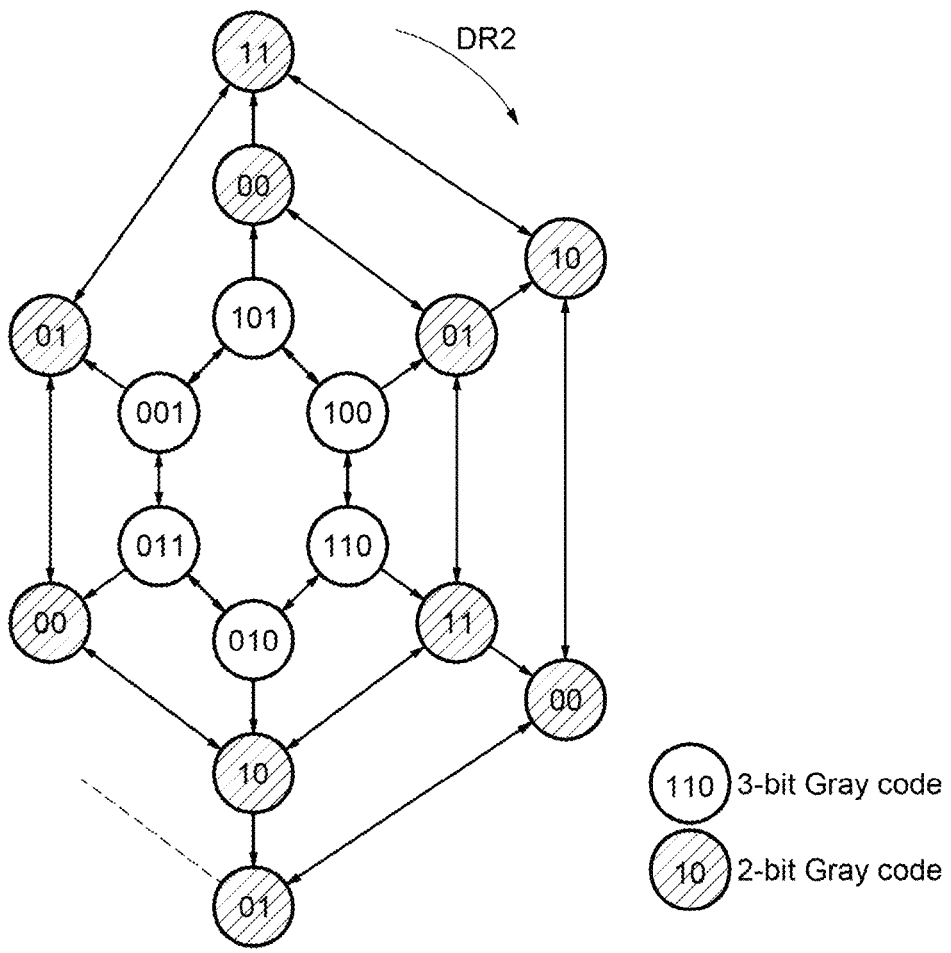

There are other possible configurations for obtaining a Gray code on three bits, as shown in FIGS. 5 to 7.

In this embodiment, the three optical sensors CPTX, CPTY and CPTZ are angularly spaced at 120° intervals and the disc 1 has a pattern MTF in the form of an opaque part obscuring half of the disc.

It can therefore be seen, as shown in FIG. 5, that when the disc 1 rotates in the direction DR2 from the position shown on the left of this figure, at least one of the sensors is obscured.

This is demonstrated in the state machine illustrated in FIG. 6, in which, for the sake of simplicity, it is only the correct transitions, and not the prohibited or erroneous transitions, that are shown.

The missing states or codes which cannot be obtained with the configuration of sensors arranged at 120°, namely the states or codes 000 and 111 in this case, are also omitted from this figure for the sake of simplicity. These states are considered to be erroneous or prohibited and may also result in the transmission of the error signal SR if they occur (which may indicate an attempted fraud).

Here again, the states appearing in non-hatched circles are the states of the three-bit Gray code, while the transcoded states shown in hatched circles are the states of the two-bit Gray code.

FIG. 7 shows the position of the disc as a function of the different states of the 3- and 2-bit Gray codes.

It can be seen in FIGS. 6 and 7 that, if the disc performs one revolution in the direction DR2, it passes successively through states 101, 100, 110, 010, 011 and 001 before returning to state 101.

On the other hand, it can be seen here that, by contrast with the previous example, two different states of the 2-bit Gray code correspond to two identical states of the 3-bit Gray code, for example the states 101.

The transcoding in this case is therefore dynamic transcoding, using not only the value of the current state of the 3-bit Gray code but also the value of the preceding state.

Here again, the hardware implementation of the transcoding circuit 2 is based on the use of a state machine synthesis algorithm.

Figure 8:
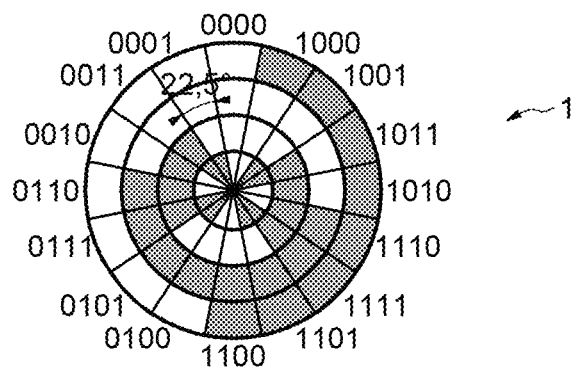
FIG. 8 shows a disc equipped with a pattern representing a Gray code on 4 bits.
Figure 9:
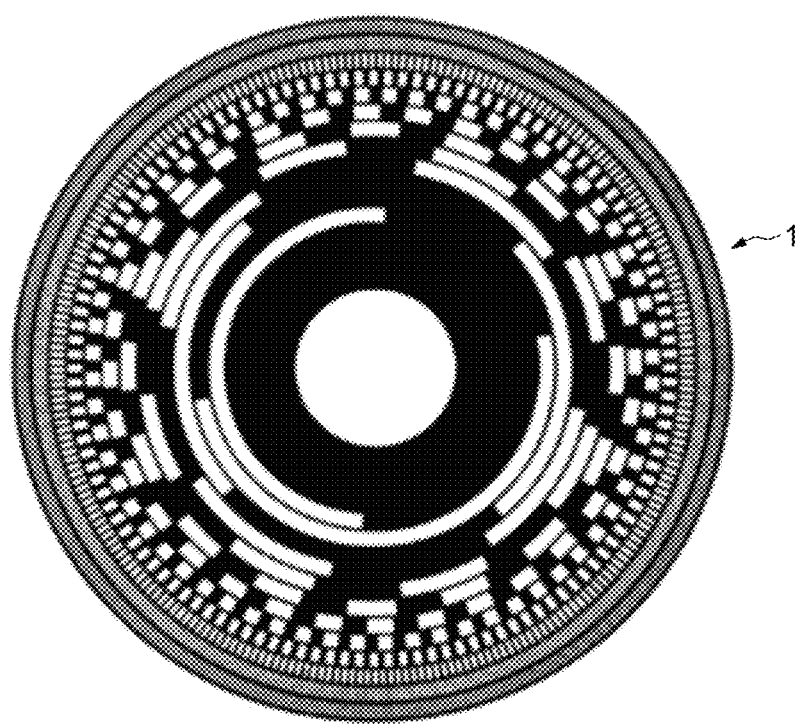
FIG. 9 shows a disc equipped with a pattern representing a Gray code encoded on 12 bits.

Other configurations of the optical disc are also possible, as shown in FIGS. 8 and 9.

In FIG. 8, there is a disc 1 equipped with a pattern representing a Gray code on 4 bits, while FIG. 9 shows a disc 1 equipped with a pattern representing a Gray code encoded on 12 bits.

Figure 10:
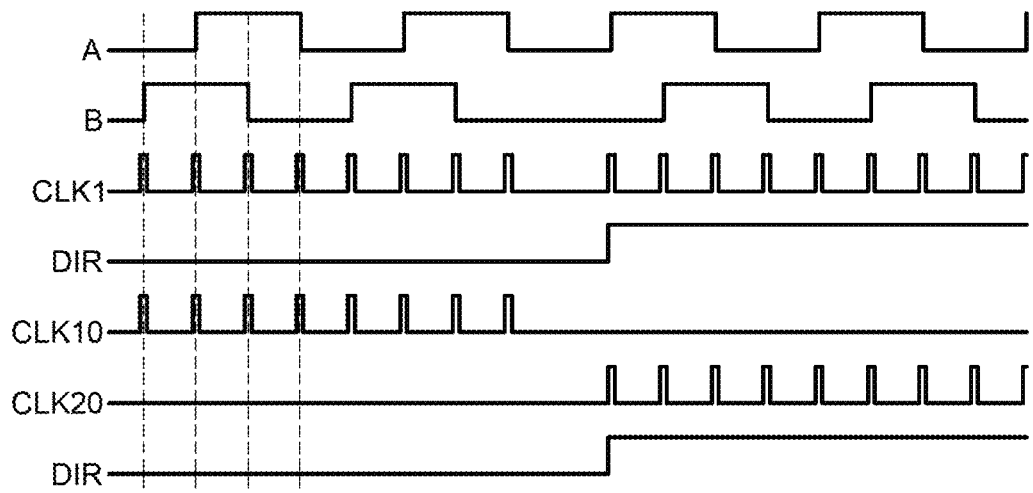
FIG. 10 shows schematically variations in time of an intermediate signal encoded on two bits in Gray code as well as the different possible signals delivered by a decoding stage.

FIG. 10 shows schematically the variations in time of the intermediate signal encoded on two bits in Gray code, A and B, as well as the different possible signals delivered by the decoding stage 3.

Depending on the structure of the decoding stage, it may deliver, for example, either a single clock signal CLK1 accompanied by a direction signal DIR, or two clock signals CLK10 and CLK20 accompanied by a direction signal DIR.

If the decoding stage delivers only one clock signal CLK1, this comprises a pulse at each change of state of the intermediate signal A, B. Additionally, as shown in the figure, at a given moment the intermediate signal A, B represents a change in the direction of rotation, indicated by a transition in the DIR signal.

And, even in this case, there continues to be one pulse of the clock signal CLK1 at each change of state of the intermediate signal A, B.

In other words, each pulse of the clock signal CLK1 represents an incrementation or a decrementation of the value of the angle of rotation of the disc, the incrementation or decrementation being defined by the value of the direction signal DIR.

However, this is not the case when the decoding stage is configured to deliver two clock signals CLK10 and CLK20.

This is because the CLK10 signal delivers pulses at each change of state of the intermediate signal A, B as long as the rotary element is rotating in a first direction.

However, when there is a change of direction, indicated by the transition in the DIR signal, there is no longer any pulse in the signal CLK10 signal; instead, it is now the CLK20 signal that includes said pulses at each change of state of the intermediate signal A, B.

Figure 11:
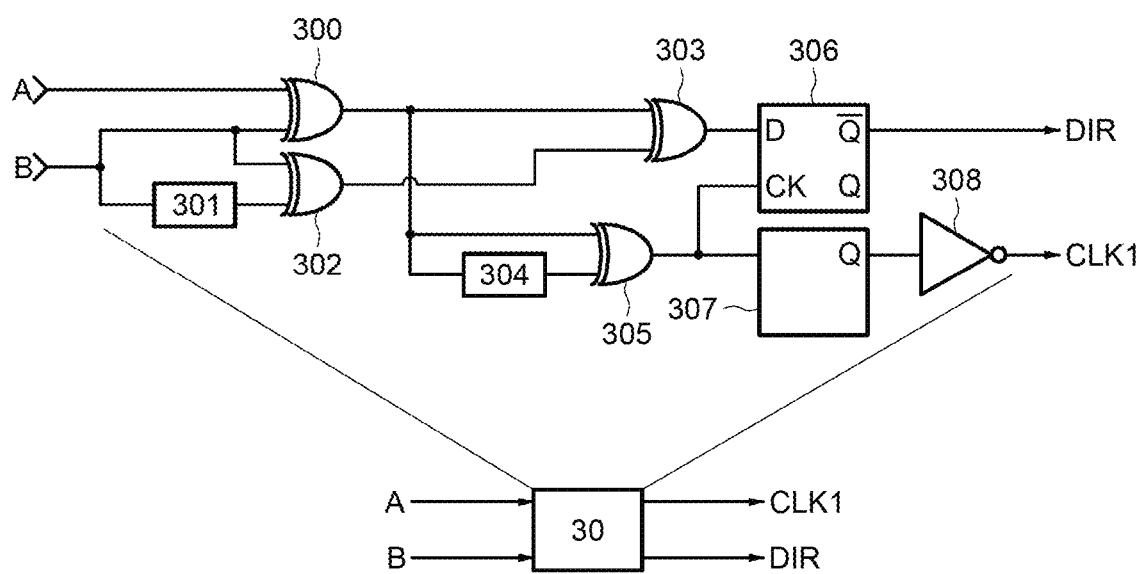
FIG. 11 shows schematically an exemplary embodiment of a decoding circuit.

FIG. 11 shows schematically an exemplary embodiment of a decoding circuit delivering a single clock signal CLK1 and the direction signal DIR.

This decoding circuit 30 may be, for example, that described in the European Patent Application Publication No. 0089171 (incorporated by reference). Some characteristics of this circuit will be noted here.

The two components A and B of the intermediate signal encoded in Gray code on two bits are delivered to the two inputs of an exclusive OR gate 300. The component B is also delivered to the first input of another exclusive OR gate 302, and to the second input of this exclusive OR gate 302 via a delay means 301.

The outputs of the two gates 300 and 302 are respectively connected to the two inputs of a third exclusive OR gate 303.

The output of the gate 300 is also connected directly to the first input of another exclusive OR gate 305, and to the second input of this gate 305 via a delay means 304.

The output of the gate 305 times a D flip-flop 306 whose data input D is connected to the output of the gate 303.

The complemented output Q of the flip-flop 306 delivers the signal DIR.

The output of the exclusive OR gate 305 is also connected to the input of a monostable multivibrator 307 whose output delivers the clock signal CLK1 via an inverter 308.

Figure 12:
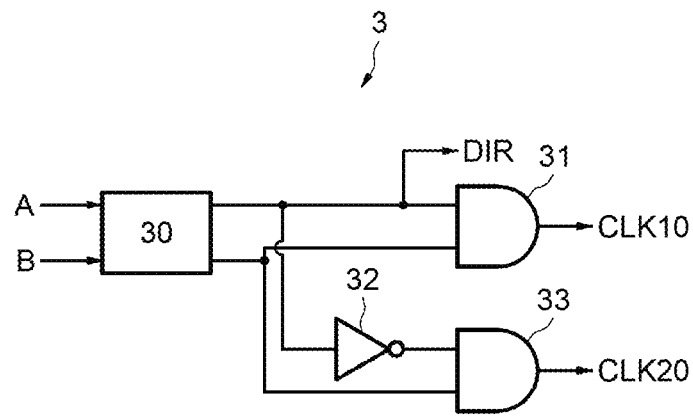
FIG. 12 shows a decoding stage.

If it is desirable to use a decoding stage capable of delivering two clock signals CLK10 and CLK20, a stage of the type depicted in FIG. 12 may be used.

This decoding stage comprises, for example, the decoding circuit 30 of FIG. 11 together with a first AND logic gate, referenced 31, a first input of which receives the direction signal DIR while its other input receives the clock signal CLK1.

Another AND logic gate, referenced 33, receives the signal DIR on a first input, via an inverter 32, and receives the clock signal CLK1 on its other input.

The two gates 31 and 33 deliver the signals CLK10 and CLK20 respectively.

The general purpose timer(s) 40 of the processing stage 4 may be synchronous or asynchronous timers.

For example, the timer made by STMicroelectronics, known under the name of "General-purpose timer TIM2", may be used as a synchronous timer.

For example, the timer made by STMicroelectronics, known under the name of "Low-power timer (LPTIM)", may be used as an asynchronous timer.

Figure 13:
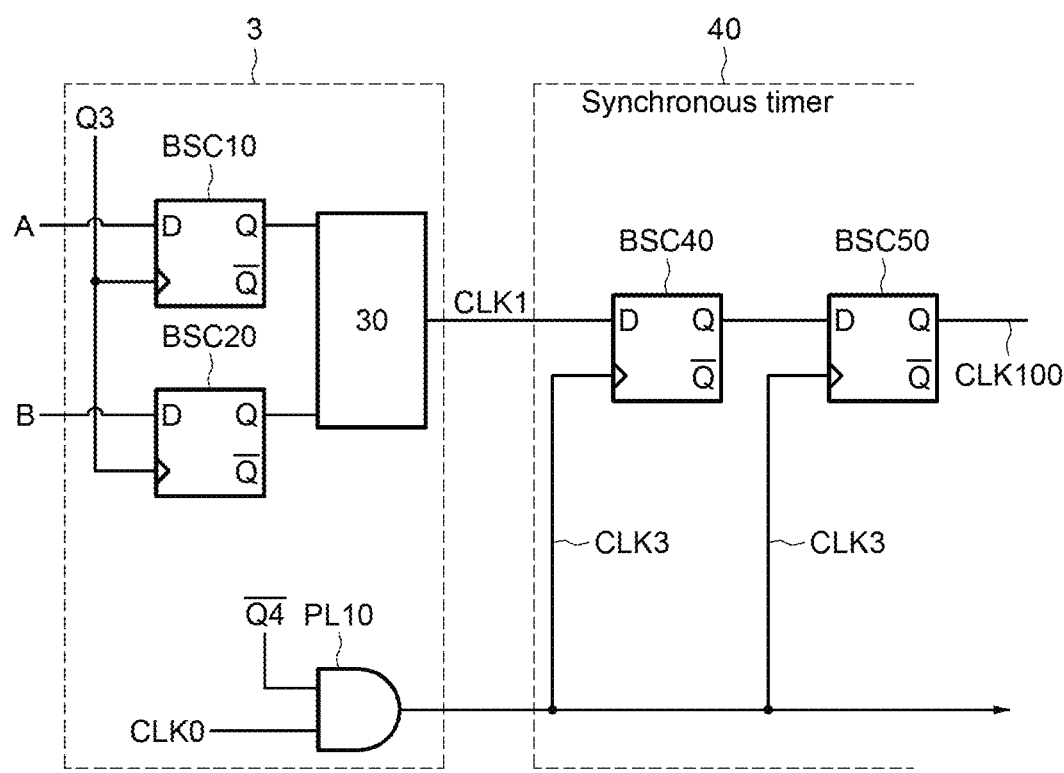
FIG. 13 shows a decoding stage and timer.
Figure 14:
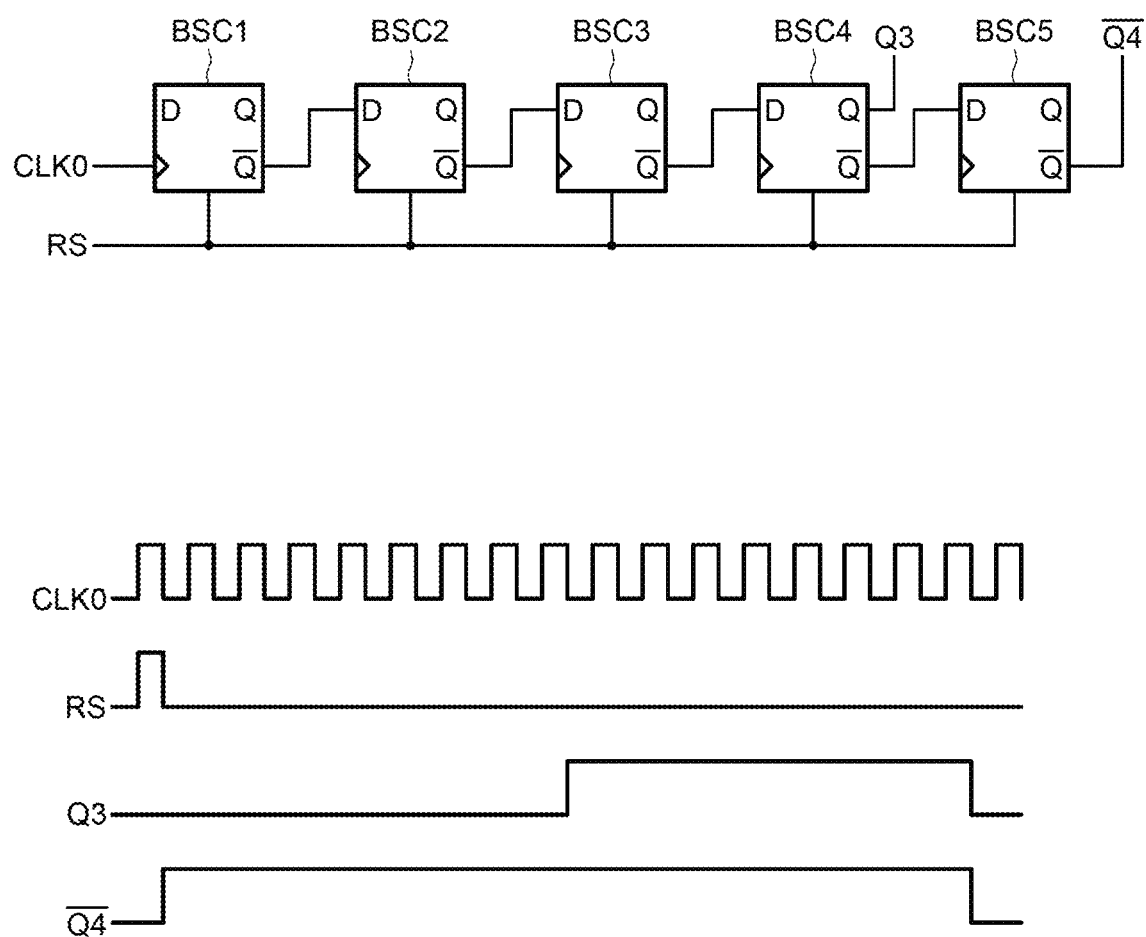
FIG. 14 shows a clock gating circuit.

Reference will now be made more particularly to FIGS. 13 and 14 to illustrate an embodiment using a "clock gating" device (the term by which this device is commonly known by those skilled in the art).

This clock gating device is particularly advantageous when the general purpose timer 40 is a synchronous timer, that is to say one having a clock synchronization circuit including, for example, two D flip-flops BSC40 and BSC50 (FIG. 13).

This synchronization circuit receives the clock signal CLK1 delivered by the decoding circuit 30, and delivers a resynchronized clock signal CLK100.

Generally, the processing stage comprising the timer 40 is incorporated in an integrated circuit comprising a microcontroller, for example the microcontroller marketed by STMicroelectronics under the reference STM 32, timed by a base clock signal CLK0 having a high frequency, of the order of a few tens of MHz for example.

And, in order to limit current consumption, it is preferable for this fast clock CLK0 to be delivered to the timer synchronization circuit during a short period of time only.

Consequently, use is made of a clock gating circuit designed to deliver a clock gating signal referenced $\overline{Q4}$ to an AND logic gate referenced PL10. The other input of this logic gate PL10 receives the base clock signal CLK0. And the output of the logic gate PL10 forms a timing clock signal CLK3 which times the flip-flops BSC40 and BSC50 of the synchronization circuit of the timer 40.

The clock gating circuit is also configured to allow the delivery of the intermediate signal A, B to the decoding circuit 30 only if the gating signal CLK3 has already been delivered, that is to say if the clock gating has already started.

For this purpose, as shown in FIG. 14, the clock gating circuit comprises, by way of example, a sequence of D flip-flops BSC1-BSC5, of which the first, BSC1, is timed by the base clock signal CLK0.

The non-complemented output Q of the penultimate flip-flop BSC4 delivers an auxiliary timing signal Q3.

The complemented output of the final flip-flop BSC5 of the sequence delivers the clock gating signal $\overline{Q4}$.

Additionally, the data input D of each successive flip-flop of the sequence from the second BSC2 to the last one BSC5 is connected to the complemented output $\overline{Q}$ of the preceding flip-flop.

The clock gating circuit further comprises two auxiliary D flip-flops BSC10, BSC20 (FIG. 13) which are timed by the auxiliary clock signal Q3 and whose respective data inputs D are intended to receive the two components A and B of the intermediate signal, and whose two non-complemented outputs Q are connected to the input of the decoding circuit.

The flip-flops BSC1-BSC5 of the sequence of flip-flops may be reinitialized by a reinitialization signal RS.

The lower part of FIG. 14 shows timing charts of the different signals, and it can be seen that the signal Q3 goes to the high state to enable the delivery of the intermediate signal A, B to the decoding circuit 30, while the signal $\overline{Q4}$ is already in the high state, signifying that the clock gating has already commenced.

The invention claimed is:

1. A circuit, comprising:
    an input configured to receive an incident signal comprised of a series of binary code words, wherein said binary code words have at least three bits and one or more prohibited states;
    a transcoding circuit configured to convert each binary code word of the incident signal into an intermediate binary code word on two bits;
    a decoding circuit configured to decode the intermediate binary code words from the transcoding circuit to generate a clock signal and a data signal; and
    wherein the transcoding circuit is further configured to generate an error signal in the response to either a prohibited transition between two consecutive binary code words of the incident signal or if the binary code word of the incident signal has one of said one or more prohibited states.

2. The circuit of claim 1, wherein each binary code word of the incident signal is a 3-bit Gray code and each intermediate binary code word is a 2-bit Gray code.

3. The circuit of claim 1, wherein the clock signal is indicative of an amount of change in the incident signal and the data signal is indicative of a direction of change in the incident signal.

4. The circuit of claim 3, wherein the incident signal is generated in response to rotation of a measuring device.

5. The circuit of claim 4, wherein the measuring device is a utility meter including a rotary element equipped with a pattern representing a reflected binary code.

6. The circuit of claim 5, further comprising a detection circuit comprising at least three sensors interacting with the rotary element and configured to generate the incident signal wherein the series of binary code words represent the reflected binary code.

7. The circuit of claim 6, wherein the number of sensors is equal to three.

8. The circuit of claim 7, wherein the sensors are offset by 120 degrees from each other.

9. The circuit of claim 5, wherein the utility meter is one of a gas meter or a water meter.

10. The circuit of claim 1, further comprising a general purpose timer circuit designed to receive said clock signal and said data signal.

11. The circuit of claim 1, wherein said general purpose timer circuit is a synchronous timer having at least one clock synchronization circuit containing D flip-flops receiving said clock signal and timed by a timing clock signal, and
    wherein the decoding circuit further comprises a clock gating circuit configured to generate a clock gating signal and to output the timing clock signal on the basis of a base clock signal only if the clock gating signal is present.

12. The circuit of claim 11, wherein the clock gating circuit is further configured to allow the delivery of the intermediate binary code word for decoding only if the clock gating signal has been generated.

13. The circuit of claim 12, wherein the clock gating circuit comprises:
- a sequence of D flip-flops wherein:
    - a first flip-flop is timed by the base clock signal,
    - a non-complemented output of a penultimate flip-flop in the sequence of D flip-flops delivers an auxiliary timing signal,
    - a complemented output of a last flip-flop in the sequence of D flip-flops delivers said clock gating signal, and
    - a data input of each successive flip-flop in the sequence of D flip-flops from a second flip-flop to a last flip-flop is connected to the complemented output of the preceding flip-flop; and
- two auxiliary D flip-flops which are timed by the auxiliary clock signal and whose respective data inputs are configured to receive the two bits of the intermediate binary code word, and whose two non-complemented outputs are input to the decoding circuit.

* * * * *